F. C. ANDERSON.
VALVE MECHANISM FOR WATER COLUMNS.
APPLICATION FILED AUG. 21, 1909.
958,351.
Patented May 17, 1910.
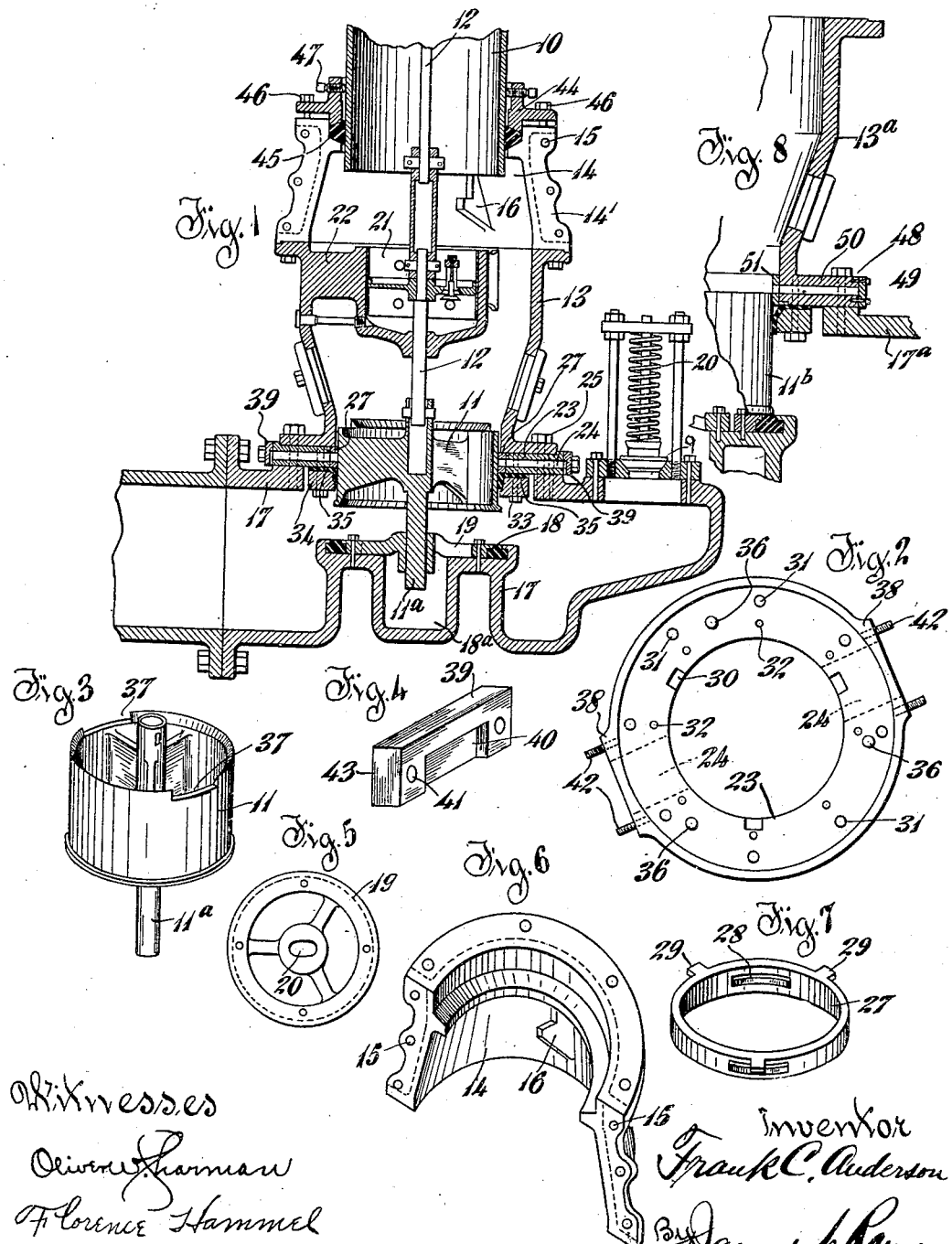

UNITED STATES PATENT OFFICE.

FRANK C. ANDERSON, OF CINCINNATI, OHIO, ASSIGNOR TO AMERICAN VALVE & METER COMPANY, OF CINCINNATI, OHIO, A CORPORATION OF WEST VIRGINIA.

VALVE MECHANISM FOR WATER-COLUMNS.

958,351.   Specification of Letters Patent.   Patented May 17, 1910.

Application filed August 21, 1909. Serial No. 513,905.

*To all whom it may concern:*

Be it known that I, FRANK C. ANDERSON, a citizen of the United States, residing at Cincinnati, in the county of Hamilton and State of Ohio, have invented certain new and useful Improvements in Valve Mechanism for Water-Columns, of which the following is a specification.

My invention relates to improvements in pipe valves and valve chambers, and more particularly to that form of pipe valves used by various railroads to regulate the flow of water through water columns when supplying the tenders of locomotives with water.

It is the object of my invention to provide means whereby the water column may drain quickly after the valve has been closed, means whereby the water may be retained in the column if desired, and also to provide a more simple and easy access to the valve chamber. In this type of valve chamber now being used a waste valve is provided at the lower base portion of the valve chamber making it necessary for a workman to work underneath the valve chamber at the bottom of the pit in case said waste valve should need attention, which is quite often due to the frequent frictional contact of the waste valve with the discharge opening in which it operates during the movements of the main valve with which it is connected, whereby the waste valve and engaging parts become worn and cause leakage which can only be overcome by renewing the waste valve. In the present form of valve chamber it is also necessary to raise the stand pipe or column when it is desired to make any repairs inside the valve chamber.

With my invention I dispense with the waste valve at the base of the valve chamber entirely, which very often gets out of order, and provide means whereby the main valve permits the column to drain, and I also construct the valve chamber in such a manner as to allow easy access to said valve chamber without necessitating raising the main stand pipe.

My invention consists in a valve chamber part of which is made in two semi-annular pieces bolted together, a waste flange or ring resting upon the valve chamber proper, port holes therein, diametrically opposite, reversible plates fastened over the said port holes in the waste flange or ring, shaped in such a manner as to allow water to flow through the port holes in the flange when bolted to said flange or ring for drainage, and completely stop the flow of water through the port holes when reversed and bolted to said flange, slots cut in the upper edge of the main valve and adapted to coincide with port holes in said flange or ring, a brass ring fitted snugly on the inner surface of the flange or ring, and having port holes to coincide with port holes of said flange or ring, and lugs on said brass ring which coincide with recesses in the flange or ring.

My invention also consists in certain parts and combination of parts herein set forth.

In the drawing: Figure 1 represents a vertical section through a valve and valve chamber equipped with my invention. Fig. 2 is a plan view of the flange or ring employed in my invention. Fig. 3 is a perspective view of the main valve. Fig. 4 is a perspective view of the plate which is adapted to be bolted on the flange or ring shown in Fig. 2. Fig. 5 is a plan view of the guide plate or spider which the main valve stem engages. Fig. 6 is a perspective view of the semi-annular casing employed in the upper part of the chamber. Fig. 7 is a perspective view of the brass ring adapted to fit snugly inside of the flange or ring shown in Fig. 2. Fig. 8 shows a modification of my invention.

Referring more particularly to the drawing, 10 illustrates the common ordinary water column or stand pipe broken away. At 11 I show the main valve operated in the usual way by the valve stem 12. The casing 13 forms an annular chamber, which contains the usual dash pot 21, while the casing 14 is a split casing as shown. The two halves of said chamber 14 are adapted to be bolted together through bolt holes 15 placed in flanges 14' disposed on each side of the chamber or casing 14. The flanges on the corresponding casing engage the flanges 14' and then the casings are bolted together. Fastened to the upper end or directly above the casing 14, is a packing ring 44 which clamps down the packing 45 for the water column 10. If it is desired to remove the casing 14 for any reason the bolts 46 are first removed and then the packing ring 44 is raised and fastened to the water column 10 by means of set screws 47 and held at any desired height.

Then the bolts which clamp the two halves of the casing 14 together are removed and the chamber opened.

A lug 16 extends inwardly from each semi-annular casing 14 for the purpose of forming a support for the water column 10 when it is first being erected. The valve chamber proper shown at 17 is formed substantially in the usual manner and is slightly raised in its central part to form a valve seat 18, and is provided with a closed pocket 18ª in its central portion in which the valve stem 11ª operates. The valve seat is made preferably of rubber, the rubber being clamped in position by a packing ring 19. The packing ring 19 is provided with a spider which forms a guide for the valve stem 11ª and is bolted to the valve chamber proper to secure the rubber valve seat. If desired, the spider can be made separate and bolted to the valve chamber proper inside the packing ring, as shown in Fig. 8, but the construction shown in Fig. 1 is preferred.

Relief valve 9 is constructed in the customary manner. The perforated cylinder 21 which is commonly called the dash pot is supported by ribs 22 cast on the casing 13. Between the casing 13 and the valve chamber proper 17 I place a waste flange or ring 23 having port holes 24. Said waste flange or ring is fastened to the valve chamber 17 and casing 13 by studs 25 and has at its inner surface a preferably brass ring 27 to form a bearing for the main valve 11. Said brass ring is better shown in Fig. 7, and has port holes 28. On the periphery of the brass ring 27 I provide three small lugs 29 adapted to engage depressions or recesses 30 in the ring 23 to prevent the port holes in the brass ring becoming out of alinement with the port holes in said ring 23. The flange or ring 23 is provided with bolt holes 31 to receive the studs 25. It is also provided with holes 32 to receive the studs 33 which clamp a clamping ring 34 on the flange or ring 23. Said clamping ring 34 clamps the packing shown at 35 and is thereby made part of the flange or ring and is attached thereto before the flange or ring is put in place. To guard against the waste ring moving out of center, I provide dowel pins 36, there being as many of these as desired, three being shown. At the top edge of the main valve 11 I show recesses or slots 37 which engage or coincide with the port openings in the brass ring 27, and the flange 23. On the outer edge of the flange 23 I provide bosses 38 and fasten in each boss two threaded studs 42 adapted to engage a plate 39. Said plate 39 is best shown in Fig. 4 and has a recessed portion 40 in one side, and holes 41 adapted to receive the studs 42. The plate 39 may be placed upon the flange 23 to allow the recessed portion 40 to coincide with the port holes or opening 24 leaving the port hole open or it may be reversed and the flat side 43 may engage the port hole or opening 24, thereby closing it. I do not limit myself to this exact construction for the plate 39 can be simply a flat plate and the nuts can be run out permitting the plate to stand away from the flange or ring and drain in that way, but in the particular construction shown the plate can always be rigidly secured to the flange or ring to either drain or retain the water in the column, thus obviating any possible chance of the nuts and plates working off, dropping in the pit and becoming lost.

The spider 19, best shown in Fig. 5, has an elliptical opening 20 adapted to receive the elliptical shaped stem 11ª of the main valve. This opening being formed in this manner keeps the main valve 11 from turning circumferentially and thus eliminates the danger of the recesses 37 moving out of alinement with the port holes 24 in the flange 23 when the main valve is in its lowermost position. I do not desire myself to be limited to the recesses in the upper portion of the main valve, as shown in Fig. 1, in order to drain the column, for the main valve when seated could have its uppermost surface to drop just to the lower edge of the port holes as shown in Fig. 8, and permit the column to drain without any recesses in the main valve, but the construction shown in Fig. 1 is my preferred construction for it can be plainly seen that the construction shown in Fig. 1 obviates the handling of the casing 13 as shown in Fig. 8 when the same is being manufactured because the ring is much lighter and can be handled easier and at less expense than the construction shown in Fig. 8 where the improvement is an integral part of casing 13.

Referring more particularly to Fig. 8 of the drawing, I show a modification in which I dispense with the separate waste flange or ring 23 and also dispense with the recesses in the main valve 11. At the lower end of the casing 13ª I provide openings 48 in the flange 50 of the casing 13ª to correspond with the openings 24 of the waste flange 23 which is used in Fig. 1. I also provide plates 49 which are bolted onto the outside of the flange 50 and are adapted to close the port holes 48 if desired.

On the inner surface of the casing 13ª and opposite the flange 50 I provide a brass ring or lining 51 which forms a bearing surface for the main valve 11ᵇ and fits snugly around the main valve 11ᵇ in order that the port holes may be opened and closed by the operation of said main valve 11ᵇ. It is also seen in this modification that the main valve 11ᵇ does not necessarily have to be provided with the recesses 37 which are shown in Fig. 3 to open the port holes 48 when the main valve is in its lowermost position. In this view the upper surface of the main valve is shown in its lowermost position, and it is apparent that the opening 48 is opened. The packing for the main valve 11ᵇ is shown clamped to the flange 50 of the casing 13ᵃ and the flange 50 is bolted to the casting or lowermost section of the valve chamber 17ᵃ. Thus it is seen that I may dispense entirely with my improved waste ring, but the preferred form of my invention is that shown in Fig. 1, where I provide a separate waste ring which is preferable because of the fact that it is cheaper to manufacture and more easily handled.

In Fig. 1 I have shown the main valve in partly open position with its periphery in engagement with the waste ring to prevent any water from passing out through the port holes except when the valve is in closed position.

During severe weather, after the valve has been closed, there is a certain amount of water left in the water column 10 and this water if left in the column long enough will freeze and practically cripple the device. When it is desired to empty the column 10, reverse the plates 39 if the side 33 of the plate 39 happens to be closing the port holes 24 in the flange or ring 23 or remove the plate away from the flange or ring or detach it entirely. If the recessed portion 40 of the plate 39 is coinciding with the port holes 24 in the flange or ring 23 and the main valve being closed the recesses 37 in the upper edge of the main valve are also coinciding with the port holes in the flange 23, it is seen that the water in the column 10 is free to flow through the port holes and out into the valve pit. It is apparent with my construction that it is a simple matter to enter the valve pit and change the plate 39 if desired without working underneath the valve chamber to regulate the waste valve as is necessary in the devices now in use.

While I have shown my invention in a preferred construction, I do not wish to be limited thereto, as, for instance, the valve stem 11ᵃ and the opening which it enters in the spider 19 may be formed in any shape which will prevent the stem from turning therein. It will also be seen that when the plate 39 is rigidly fastened to the ring to retain the water in the column there is no possible danger of leakage of water from the column.

I claim:

1. A device of the character described comprising a valve chamber, a valve seat placed therein, a main valve, a main valve stem adapted to operate the main valve, recesses in the upper edge of said main valve, an annular ring fastened between the lowermost frame work of the valve chamber and an annular member of the valve chamber, plates adapted to be fastened on the outer edge of said annular ring, said plates being reversible and having recesses on one side, port holes in said annular ring, and a split casing fastened upon the annular member of the valve chamber, substantially as set forth.

2. A device of the character described comprising a split casing, a waste ring, port holes in said waste ring, recesses in the upper surface of said ring, a ring adapted to fit inside of said ring, lugs on said inner ring adapted to engage said recesses, port holes in said ring and in said inner ring adapted to coincide with each other, a plate adapted to be fastened directly in front of port holes in said ring and on the outer surface thereof, a main valve, recesses on one side of said plate to allow a free opening in valve chamber through said port holes in ring when said plate is fastened to said ring, and the main valve is closed, recesses in the upper edge of the main valve adapted to engage port holes in said ring when the main valve is in its closed position, an elliptical shaped stem on the lower end of said main valve adapted to engage an elliptical opening in a flanged spider bolted to the valve chamber and forming a clamp for the main valve seat packing, substantially as and for the purposes set forth.

3. A device of the character described comprising a split member of the valve chamber casing fastened at its upper part to engage water column pipe, a main valve operated by a main valve stem, recesses in the upper edge of the main valve, a waste ring clamped between the middle member of the valve chamber casing and the lower valve chamber casing, and a reversible plate fastened at the outer periphery of the flange, port holes in said flange adapted to coincide with the recesses in the upper edge of the main valve when said main valve is closed, substantially as set forth.

4. In a device of the character described, an annular ring, a main valve chamber made in sections adapted to clamp said annular ring between its lowermost and middle sections, said annular ring having port holes, reversible plates fastened on the outside of said ring, means for clamping the packing for the main valve to the ring, and recesses in the upper edge of the main valve adapted to coincide with the port holes in said ring when the main valve is in its lowermost position, substantially as set forth.

5. A device of the character described comprising a main valve chamber made in sections, the upper section being made in halves, said halves being adapted to be bolted together, a main valve, an elliptical main valve stem extending below the main valve, a spider fastened to the frame work of the lower member of the valve chamber having an elliptical opening in the center to receive said elliptical stem of the main valve, said spider having a flange clamping the packing for the main valve seat to the lower member of the valve chamber, substantially as and for the purposes set forth.

6. A device of the character described comprising a main valve chamber, a flat ring fastened therein, a thin ring fastened on the inner surface of said flat ring, port holes in said rings, plates fastened to the outside of said flat ring, a main valve, adapted to engage port holes in said rings when the main valve is in its open position, and adapted to disengage said openings when the main valve is closed, and means for fastening the packing for the main valve to the flat ring, substantially as set forth.

7. In a device of the character described, a valve chamber having a closed bottom, a valve seat therein, a main valve in said valve chamber, means to operate said main valve, a waste ring, and an inner ring for said waste ring, the entire innermost surface of which is adapted to engage said main valve, substantially as and for the purposes set forth.

8. A device of the character described comprising a water column, a valve chamber having drain ports, a valve seat placed in said chamber, a main valve having recesses in its upper edge adapted to coincide with said drain ports, means to operate said main valve, and means for draining said water column when the main valve is in closed position.

9. In a device of the character described, a valve chamber, a valve seat placed therein, a main valve, means to operate said main valve, a waste ring adapted to engage the periphery of said main valve, port holes in said waste ring, and plates on said ring for the purposes set forth.

10. In a device of the character described, a valve chamber, a valve seat placed therein, a main valve, a main valve stem adapted to operate the main valve, recesses in the upper edge of said main valve, and an annular ring adapted to engage the periphery of the main valve.

FRANK C. ANDERSON.

Witnesses:
JAMES N. RAMSEY,
FLORENCE HAMMEL.